(12) United States Patent
Senoh

(10) Patent No.: US 6,785,429 B1
(45) Date of Patent: Aug. 31, 2004

(54) MULTIMEDIA DATA RETRIEVAL DEVICE AND METHOD

(75) Inventor: Takanori Senoh, Hirakata (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/347,383

(22) Filed: Jul. 6, 1999

(30) Foreign Application Priority Data

Jul. 8, 1998 (JP) .......................................... 10-192539
Oct. 5, 1998 (JP) .......................................... 10-282437

(51) Int. Cl.[7] .......................... G06K 9/54; G06K 9/36; G09G 5/00; G06F 7/00
(52) U.S. Cl. ...................... 382/305; 382/232; 345/723; 707/104.1
(58) Field of Search ............................... 382/243, 305, 382/276, 232, 224; 707/104.1, 1, 3, 100; 358/403, 404; 345/723

(56) References Cited

U.S. PATENT DOCUMENTS 5,761,655 A    6/1998   Hoffman ........................ 707/4
5,870,754 A  * 2/1999   Dimitrova et al. ......... 707/104.1
6,195,497 B1 * 2/2001   Nagasaka et al. ............. 386/46
2001/0014891 A1 * 8/2001 Hoffert et al. ........... 707/104.1

OTHER PUBLICATIONS

"Contest–based Video Retrieval and Compression: a Unified Solution," Zhnag, Hong Jiang et al., Proceedings of International Conference on Image Processing, 1977, vol. 1, 26–29, Oct. 1997, pp. 13–16).*

* cited by examiner

Primary Examiner—Wenpeng Chen
(74) Attorney, Agent, or Firm—Renner, Otto, Boisselle & Sklar, LLP

(57) ABSTRACT

The multimedia data retrieval device of this invention includes: a content storage section for storing a plurality of compressed contents; a client terminal for inputting feature data, a feature data storage section for reading feature data extracted from at least one of the compressed contents from the content storage section and storing the feature data of the at least one compressed contents; and a content retrieval section for selecting feature data approximate to the feature data input via the client terminal among the feature data stored in the feature data storage section, and retrieving a content having the selected feature data from the content storage section.

15 Claims, 13 Drawing Sheets

FIG.2

| Property | Data |
|---|---|
| Shape 1 | Opaque macro block pattern |
| Shape 2 | Mesh vertex coordinates |
| Color | Chrominance DC component of block |
| Brightness | Luminance DC component of block |
| Motion | Average of motion vector |
| Texture | DC / AC components of block |
| Tone 1 | LPC coefficient |
| Tone 2 | Spectrum normalization coefficient |
| Rhythm | Temporal change of amplitude |
| Melody 1 | Temporal change of LPC coefficient |
| Melody 2 | Temporal change of spectrum normalization coefficient |
| Word | In description |
| ........ | ........ |

DC component of chrominance data

Feature data of color

MB  MB

Motion data

Average for object

Time

Feature data of motion information

MB  MB

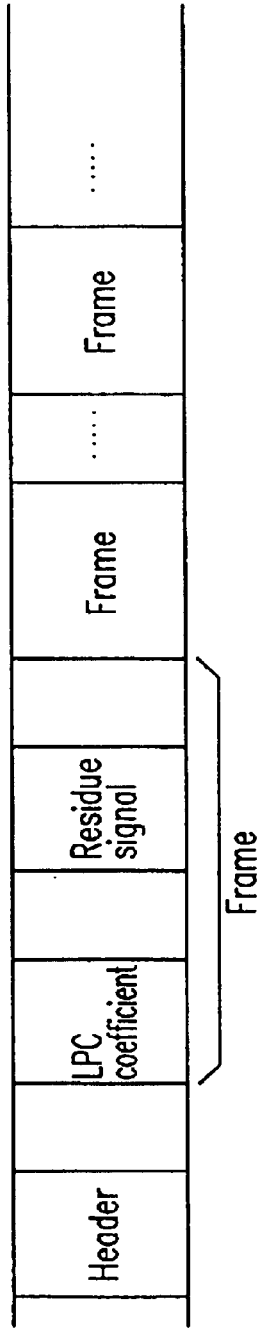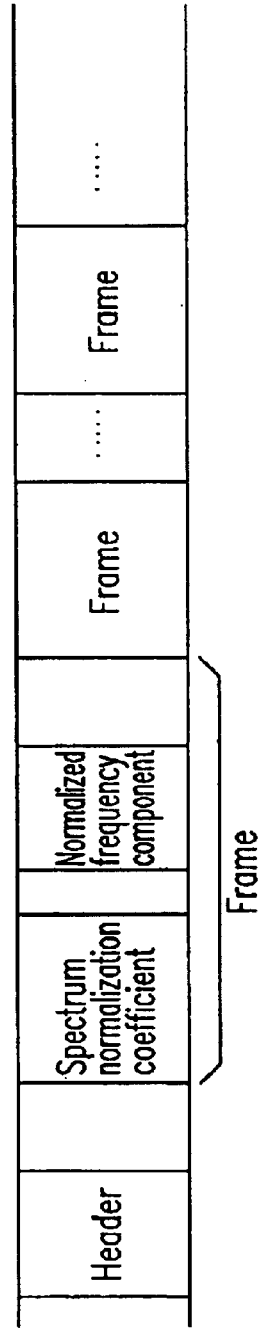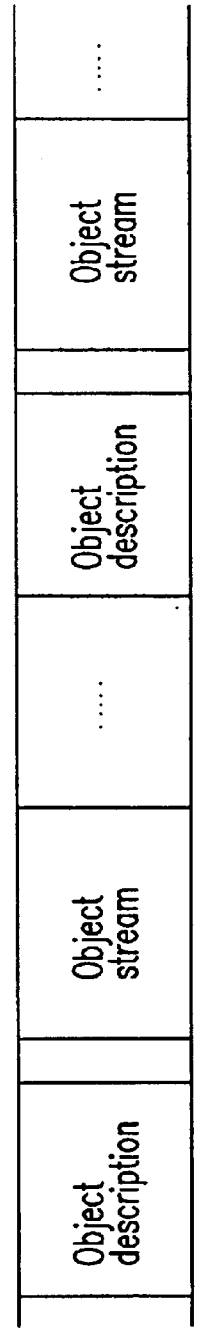

FIG. 14

Example of property data

| Object | A | B | ... | E | F | ... | I | J | ... |
|---|---|---|---|---|---|---|---|---|---|
| Shape 1 | Round | Two-leg type | | Round | Four-leg type | | Triangle | Rectangle | |
| Shape 2 | Polygon | Two-leg type | | Polygon | Four-leg type | | Triangle | Rectangle | |
| Color | Red | Skin color | | Yellow | Brown | | Silver | Blue | |
| Brightness | 190 | 120 | | 160 | 130 | | 200 | 80 | |
| Motion | (0, −1) | (±10, 0) | | (+1, 0) | (±3, 0) | | (20, 10) | (10, 0) | |
| Texture | Even | Skin-like | | Even | Hide-like | | Metal | Metal | |
| Word | Evening sun | Person | | Moon | Horse | | Airplane | Car | |
| ... | | | | | | | | | |

FIG. 16

Example of keyword dictionary

| Keyword | Moon | Evening sun | ... | Person | Horse | ... | Run | Walk |
|---|---|---|---|---|---|---|---|---|
| Shape 1 | Round | Round | | Two-leg type | Four-leg type | | | |
| Shape 2 | Polygon | Polygon | | Two-leg type | Four-leg type | | | |
| Color | Yellow | Red | | Skin color | Brown | | | |
| Brightness | 150 | 192 | | 128 | 128 | | | |
| Motion | (+1, 0) | (0, −1) | | | | | (±10, 0) | (±3, 0) |
| Texture | Even | Even | | Skin-like | Hide-like | | | |
| Word | Moon | Evening sun | | Person | Horse | | Run | Walk |
| ...... | | | | | | | | |

| Feature keyword | Data type |
|---|---|
| Principal colors | RGB |
| Red component | Byte |
| Blue component | Byte |
| Green component | Byte |
| Width | Integer |
| Height | Integer |
| ............... | ............ |

MULTIMEDIA DATA RETRIEVAL DEVICE AND METHOD

BACKGROUND OF THE INVENTION

1. Field of the Invention

The present invention relates to a multimedia data retrieval device located between a server which stores a plurality of contents representing images, sounds, and the like and a client who desires to retrieve content, for searching the contents to retrieve the content desired by the client and providing the retrieved content to the client, and a retrieval method for such a retrieval device.

2. Description of the Related Art

A conventional system for searching multimedia contents produces miniature images representing outlines of the respective contents. Together with such miniature images, data representing the features of the contents, such as image size and dominant color information, are created as feature data. Such feature data is directly designated to retrieve a content corresponding to the designated feature data.

FIG. 17 is a view illustrating the construction of a conventional multimedia content retrieval system. Referring to FIG. 17, multimedia contents are stored in a disk 103 mounted on a disk drive 101. The contents are read from the disk 103 under control of a file server 102, transmitted to the client side via a communication line 106, and displayed on a display 104 of a computer 105.

The client inputs a feature keyword for a desired content, as shown in FIG. 18, for facilitating retrieval of the desired content. Property data representing the features of a plurality of contents stored in the disk 103 are stored in advance in the disk 103 in the form of a table as shown in FIG. 18. The computer 105 compares the feature keyword input by the client with the feature data stored in the disk 103, selects a certain number of feature data which are approximate to the feature keyword in order of most approximate to less approximate, and displays miniature images of contents having the selected feature data on the display 104. The client selects an appropriate content by referring to the displayed miniature images, thereby to obtain the desired content.

The above retrieval technique is disclosed, for example, in U.S. Pat. No. 5,761,655 titled "Image File Storage and Retrieval System".

The above conventional retrieval technique has a disadvantage that, in the case where contents are compressed by a coding method before being stored, it is necessary to first decompress the compressed contents to produce non-compressed contents, and create feature data based on the non-compressed contents. Another disadvantage is that high-speed retrieval is not possible if feature data has not been created in advance.

In the above conventional retrieval technique, the client is requested to express a feature of a desired content by a low-level keyword such as the color, width, and height. It is not possible for the client to use high-level expression, such as "a scene where a person is running in the evening sun", for example, when high-level retrieval is desired.

SUMMARY OF THE INVENTION

The multimedia data retrieval device of this invention includes: a content storage section for storing a plurality of compressed contents; a client terminal for inputting feature data; a feature data storage section for reading feature data extracted from at least one of the compressed contents from the content storage section and storing the feature data of the at least one compressed contents; and a content retrieval section for selecting feature data approximate to the feature data input via the client terminal among the feature data stored in the feature data storage section, and retrieving a content having the selected feature data from the content storage section.

In one embodiment of the invention, each of the compressed contents includes a plurality of macro blocks representing an image shape, the image shape represented by the macro blocks is converted into a value consisting of at least one bit, and the bit is used as feature data of a shape represented by the content.

In another embodiment of the invention, each of the compressed contents includes mesh-coded data representing an image shape, and the mesh-coded data is used as feature data of a shape represented by the content.

In still another embodiment of the invention, each of the compressed contents includes a plurality of macro blocks representing an image shape, an average of DC components of a luminance component (Y) and a DC component of each of chrominance components (Pb, Pr) are obtained for each macro block, and the average and the DC components are used as feature data of color information and brightness information represented by the content In still another embodiment of the invention, each of the compressed contents includes a plurality of macro blocks representing an image shape, motions of an object represented by macro block motion information are read to obtain an average of the motions of the object, and the average is used as feature data of motion information of the object represented by the content.

In still another embodiment of the invention, each of the compressed contents includes a plurality of macro blocks representing an image shape, DC components and AC components of a luminance component and DC components and AC components of a chrominance component of an object represented by the macro blocks are read, and averages of the respective components are obtained and used an feature data of texture information of the object represented by the content.

In still another embodiment of the invention, each of the compressed contents includes frames representing sound, LPC coefficients recorded for each frame are read, and an average of the LPC coefficients is obtained and used as feature data of tone information represented by the multimedia content.

In still another embodiment of the invention, each of the compressed contents includes frames representing sound, spectrum normalization coefficients recorded for each frame are read, and an average of the spectrum normalization coefficients is obtained for each predetermined time period and used an feature data of tone information.

In still another embodiment of the invention, each of the compressed contents includes frames representing sound, a prediction residual/recorded for each frame is read, and the prediction residual is used as feature data of rhythm information.

In still another embodiment of the invention, each of the compressed contents includes frames representing sound, a frequency component after spectrum normalization performed for each frame is read, and the frequency component is used as feature data of rhythm information.

In still another embodiment of the invention, each of the compressed contents includes frames representing sound, LPC coefficients recorded for each frame are read, and a temporal change of the LPC coefficients is used as feature data of melody information.

In still another embodiment of the invention, each of the compressed contents includes frames representing sound, spectrum normalization coefficients recorded for each frame are read, and a temporal change of the spectrum normalization coefficients is used as feature data of melody information.

In still another embodiment of the invention, each of the compressed contents includes a plurality of objects, an object description recorded for each object is read, and a frequency of appearance of a word, as well as a frequency of appearance of a combination of a word and a preceding or following word, used in the object description are used as feature data of word information.

According to another aspect of the invention, a multimedia data retrieval method is provided. The method includes the steps of: storing a plurality of compressed contents; inputting feature data via a client terminal; reading feature data extracted from the compressed contents and storing the feature data of the compressed contents; and selecting feature data approximate to the feature data input via the client terminal among the stored feature data, and retrieving a content having the selected feature data from the stored contents.

Alternatively, the multimedia data retrieval device of this invention includes: a content storage section for storing a plurality of contents; a client terminal for inputting a feature description text; a feature data storage section for reading feature data of the contents from the content storage section and storing the feature data of the contents; and a content retrieval section for extracting a keyword from the feature description text input via the client terminal, converting the keyword into feature data, selecting feature data approximate to the feature data of the keyword among the feature data stored in the feature data storage section, and retrieving a content having the selected feature data from the content storage section.

In one embodiment of the invention, the content retrieval section includes a keyword dictionary for converting a keyword into feature data, and the keyword extracted from the feature description text is converted into the feature data using the keyword dictionary.

In another embodiment of the invention, the content retrieval section extracts a major part of speech from the feature description text to be used as a keyword.

In still another embodiment of the invention, the content retrieval section uses shape information of a content as the feature data.

In still another embodiment of the invention, the content retrieval section uses color information and brightness information of a content as the feature data.

In still another embodiment of the invention, the content retrieval section uses motion information of a content as the feature data.

In still another embodiment of the invention, the content retrieval section uses texture information of a compressed content as the feature data.

Alternatively, the multimedia data retrieval method of this invention includes the steps of: storing a plurality of contents; inputting a feature description text via a client terminal; reading feature data of the contents and storing the feature data; and extracting a keyword from the feature description text input via the client terminal, converting the keyword into feature data, selecting feature data approximate to the feature data of the keyword among the stored feature data, and retrieving a content having the selected feature data from the stored contents.

Thus, the invention described herein makes possible the advantages of (1) providing a multimedia data retrieval device capable of retrieving a content at high speed using high-level expression, and (2) providing a retrieval method for such a device.

These and other advantages of the present invention will become apparent to those skilled in the art upon reading and understanding the following detailed description with reference to the accompanying figures.

BRIEF DESCRIPTION OF THE DRAWINGS

FIG. 2 is a view showing items of feature data of an object stored in a feature data memory in Example 1;

FIG. 10 is a view illustrating a data structure of a compressed audio content in Example 1;

FIG. 11 is a view illustrating a data structure of a compressed audio content in Example 1;

FIG. 12 is a view illustrating a data structure of a compressed multimedia content in Example 1;

FIG. 14 is a data table stored in a feature data memory in Example 2;

FIG. 16 is a data table stored in a keyword dictionary in Example 2;

DESCRIPTION OF THE PREFERRED EMBODIMENTS

EXAMPLE 1

Figure 1:
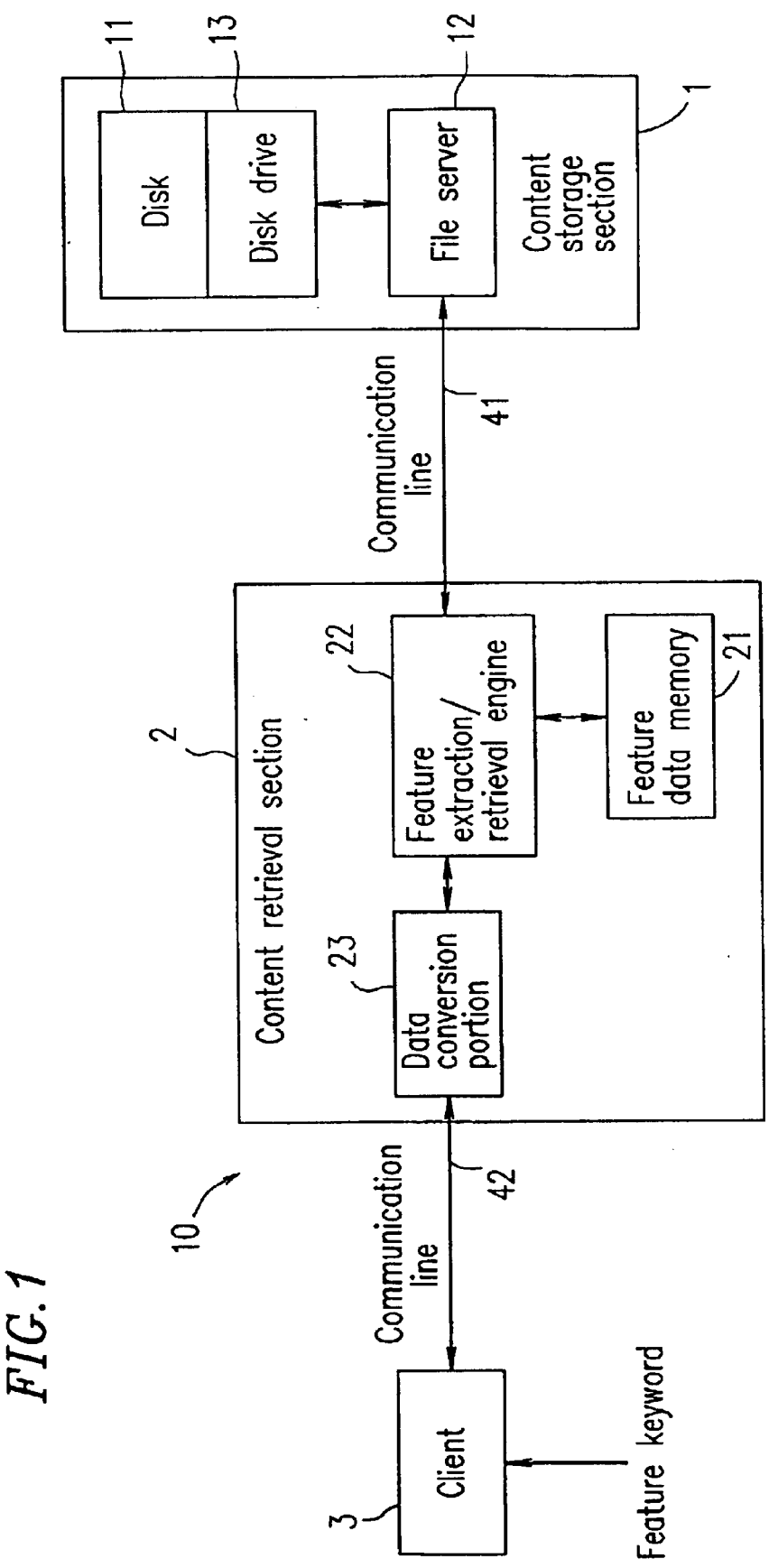
FIG. 1 is a view illustrating a construction of a multimedia content retrieval device of Example 1 according to the present invention.

FIG. 1 is a view illustrating the construction of a multimedia content retrieval device of Example 1 according to the present invention. Referring to FIG. 1, a multimedia content retrieval device 10 includes a content storage section 1, a content retrieval section 2, a client terminal 3, and communication lines 41 and 42. The content storage section 1 stores a plurality of coded compressed contents representing images, sounds, and the like. The content retrieval section 2 accesses the content storage section 1 for retrieving a content The client terminal 3 requests the content retrieval section 2 to retrieve a content. Normally, a plurality of content storage sections 1 and a plurality of client terminals 3 are connected via communication lines so that each of the client terminals 3 can access any of the content storage sections 1 via the content retrieval section 2.

The content storage section 1 includes a file server 12 and a disk drive 13. The disk drive 13 records and reproduces a plurality of coded compressed contents on and from a disk 11. The file server 12 controls the disk drive 13 to control the recording and reproduction of contents on and from the disk 11, and performs data communication with external terminals via the communication line 41.

The content retrieval section 2 includes a feature data memory 21, a feature extraction/retrieval engine 22, and a data conversion portion 23. The feature extraction/retrieval engine 22 accesses the content storage section 1 via the communication line 41, so as to extract feature data from a plurality of objects included in each of a plurality of contents stored in the disk 11 for each content, and store the extracted feature data of the objects in the feature data memory 21. The data conversion portion 23 receives data from the client terminal 3 via the communication line 42 and converts the received data into feature data.

FIG. 2 shows exemplary items of feature data of objects to be stored in the feature data memory 21. The exemplary items of feature data include the shape, color and brightness, motion, texture, tone, rhythm, melody, word, and the like of an object. FIG. 2 merely shows the meaning of the respective items of feature data, which should be expressed in their respective formats. At least one of the items of feature data is selected in accordance with the type of the object, to be used as feature data of the object.

The client terminal 3 includes a computer, a keyboard, a memory, a display, and the like. Upon receipt of data by the client's operation of the keyboard and the like, the client terminal 3 transmits the data to the data conversion portion 23 of the content retrieval section 2 via the communication line 42. The data conversion portion 23 converts the data into the same format as that of the feature data stored in the feature data memory 21, and transfers the resultant feature data to the feature extraction/retrieval engine 22. The feature extraction/retrieval engine 22 searches the feature data memory 21 to select feature data which is most approximate to the transferred feature data and thus an object having the selected feature data, so as to determine a content including the object. The feature extraction/retrieval engine 22 instructs the file server 12 of the content storage section 1 to retrieve the determined content via the communication line 41. The file server 12 reads the content from the disk 11, and supplies the content to the client terminal 3 via the content retrieval section 2. The client terminal 3 displays, reproduces, or records the retrieved content.

Figure 3:
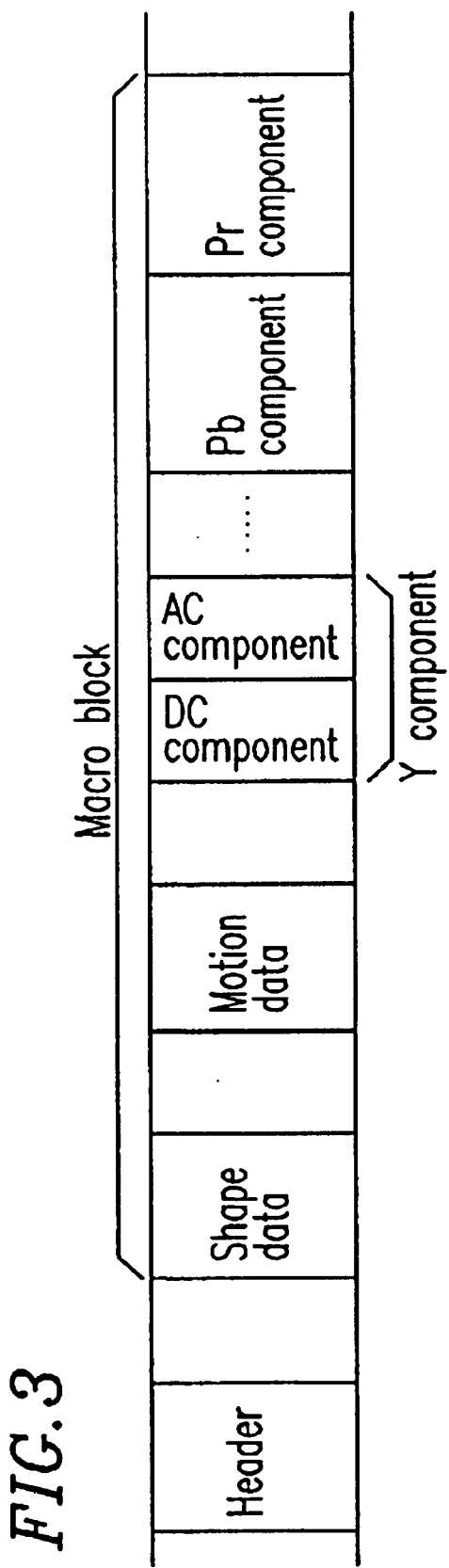
FIG. 3 is a view illustrating a data structure of a compressed content in Example 1.

FIG. 3 is a view of the data structure of a compressed content in this example The content in this example is a multimedia content representing an image shape, sound, and the like, which is compressed by a compression coding method such as MPEG. When the content represents an image, the data structure of the content includes a header which contains information such as the size and compression method of the image, the bit rate at which the data is read and the frame rate at which the data is displayed after decompression, and the amount of data to be read at one time.

In the MPEG method, each frame of an image is subjected to discrete cosine transform (DCT) for each block of 8×8 pixels as a unit. Coefficients obtained by the DCT are coded sequentially into variable-length codes which are arranged in order from a DC component to an AC higher-frequency component. In the case of a color image, four adjacent blocks are used, to obtain four blocks indicating a luminance component (Y) and each one block indicating chrominance components (Pb, Pr), which are sequentially arranged in the data structure and called a macro block as a unit. The macro block may be subjected to motion-compensated prediction coding so that a motion between frames can be compensated. In this case, data on a motion vector used for the motion compensation is inserted at the head of each macro block in the data structure.

In an MPEG4 compression method, an image in a frame is divided into a layer representing a person, for example, in the foreground and a layer representing a mountain and the like, for example, in the background. A significant portion of the image of each layer is called an object, and only macro blocks corresponding to the significant portion are recorded. The shape of the object is discernible from the transparency of pixels in a region including the object. Such shape data is coded for each macro block and inserted at a position preceding the motion vector data.

The details of the MPEG4 are described in ISO/IEC 14496-1, -2, -3, Final Committee Draft of International Standard, May 1998.

Hereinbelow, the method for extracting feature data from a content compressed by the above MPEG method and retrieving a content using feature data will be described in detail.

In the case of extracting the shape of an object as feature data, the feature extraction/retrieval engine 22 of the content retrieval section 2 scans compressed contents stored in the disk 11 of the content storage section 1 sequentially, to read the shape of the object represented in corresponding macro blocks. At the same time, the feature extraction/retrieval engine 22 secures a memory region composed of the same number of bits as the number of macro blocks in one frame in the feature data memory 21 for storing feature data. For example, referring to FIG. 4, if all pixels in a macro block MB indicate "0" (transparent), a bit CB of feature data corresponding to this macro block MB is set at "0". Likewise, if a macro block MB includes a pixel indicating "1" (opaque), i.e., if a macro block MB represents an object, a bit CB of the feature data corresponding to this macro block MB is set at "1". In this way, feature data indicating the shape of the object is obtained. Thus, the shapes of objects are extracted for all multimedia contents stored in the disk 11, and feature data indicating the shapes of the objects are sequentially stored in the feature data memory 21.

When the client attempts to retrieve a content containing an object of a desired shape, the client inputs data indicating the desired shape to the client terminal 3. The client terminal 3 transmits the data indicating the shape to the data conversion portion 23 of the content retrieval section 2. The data indicating the shape may be hand-written data or data in the same format as that of the feature data stored in the feature data memory 21. If the data transmitted from the client terminal 3 is hand-written data, the data conversion portion 23 discerns the shape indicated by the data, converts the discerned shape into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data which is most approximate to the feature data transmitted from the client terminal 3, so as to determine a content including the object. The feature extraction/retrieval engine 22 instructs the file server 12 of the content storage section 1 to retrieve the determined content. The file server 12 reads the content from the disk 11, and supplies the content to the client terminal 3 via the content retrieval section 2.

The method for obtaining the most approximate feature data is as follows. Respective bits of the feature data transmitted from the client terminal 3 are compared with corresponding bits of feature data stored in the feature data memory 21, to obtain absolutes of the differences between the corresponding two bit values for all bits and then calculate the sum of the absolutes (difference). This calculation is performed for all the shape feature data stored in the feature data memory 21, and feature data which provides the smallest sum is designated as the most approximate feature data.

Figures 4, 5:
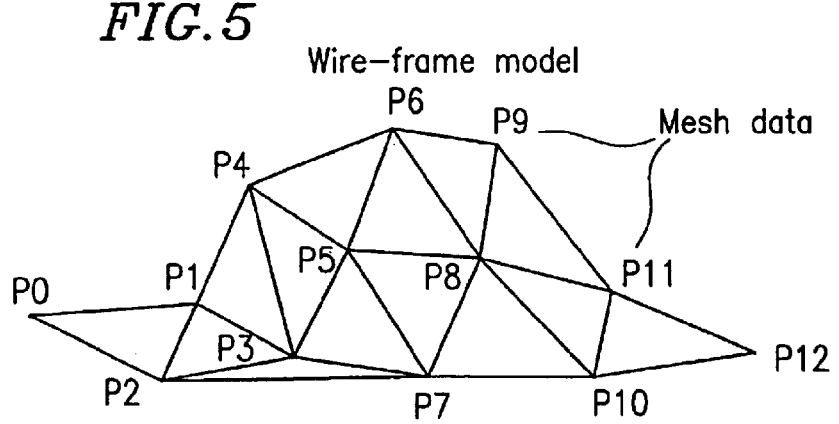
FIG. 4 is a view illustrating a processing of extracting the shape of an object as feature data.
FIG. 5 is a view illustrating an alternative processing of extracting the shape of an object as feature data.

In the case where the shape of a content is indicated by the coordinates of vertexes of a computer graphic wire-frame model as shown in FIG. 5 and the content is compressed by the mesh coding method of MPEG4, the feature extraction/retrieval engine 22 of the content retrieval section 2 extracts mesh-coded data of all compressed contents stored in the disk 11 of the content storage section 1 as respective feature data, and stores the extracted feature data in the feature data memory 21.

Upon receipt of mesh-coded data from the client terminal 3 as feature data, the feature extraction/retrieval engine 22 searches the feature data memory 21 to select feature data having the smallest difference from the feature data transmitted from the client terminal 3 and determine a content having the selected feature data. The feature extraction/retrieval engine 22 instructs the file server 12 of the content storage section 1 to retrieve the determined content. The file server 12 reads the content from the disk 11, and supplies the content to the client terminal 3 via the content retrieval section 2.

Figure 6:
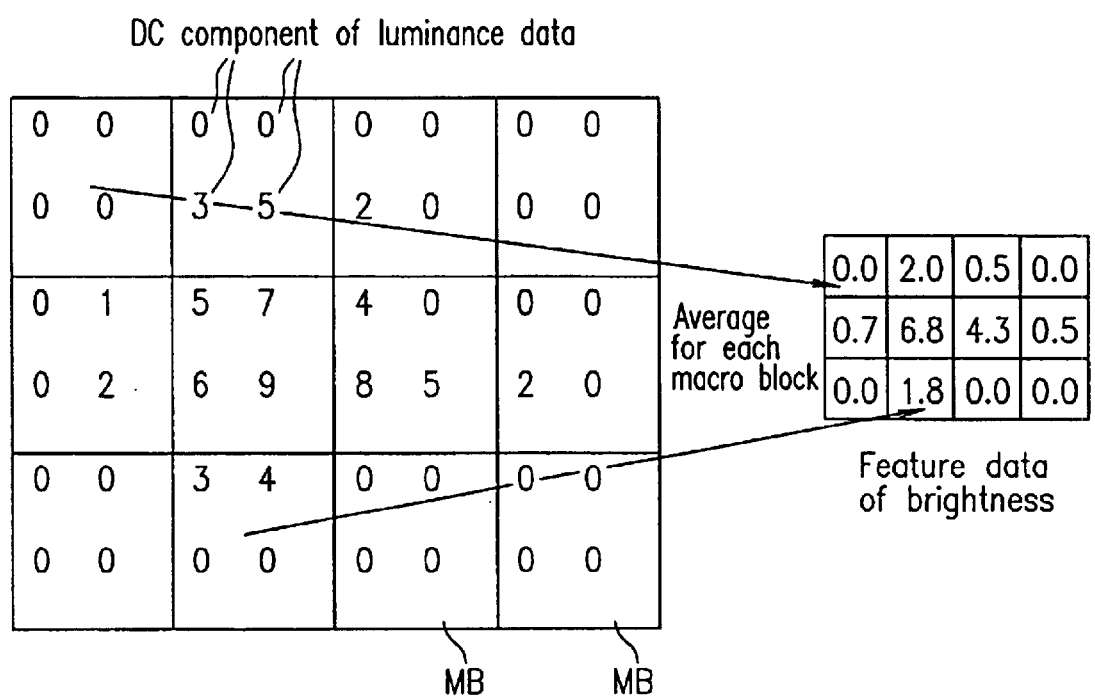
FIG. 6 is a view illustrating a processing of extracting the brightness of an object as feature data.
Figure 7:
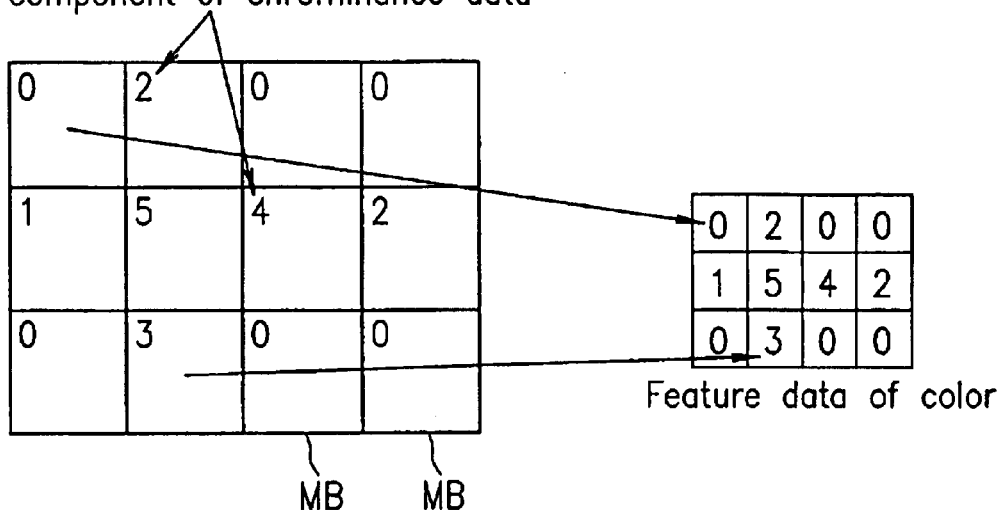
FIG. 7 is a view illustrating a processing of extracting the color of an object as feature data.

In the case of extracting the color and brightness of an object as feature data, the feature extraction/retrieval engine 22 of the content retrieval section 2 sequentially scans compressed contents stored in the disk 11 of the content storage section 1 to read the DC components of luminance components (Y), as well as DC components of chrominance components (Pb, Pr), for respective macro blocks sequentially. At the same time, the feature extraction/retrieval engine 22 secures a memory region composed of the number of bits three times as large as the number of macro blocks in an object in the feature data memory 21 for storing feature data. Then, as shown in FIG. 6, for example, averages of DC components of respective luminance components (Y) for respective macro blocks MB are calculated, and the resultant averages of the macro blocks MB are stored in the feature data memory 21 as feature data. Also, as shown in FIG. 7, for example, DC components of respective chrominance components (Pb, Pr) for respective macro blocks MB are obtained as feature data and stored in the feature data memory 21. Thus, information on brightness and color is obtained as feature data of an object. In this way, color and brightness information is extracted for all multimedia contents stored in the disk 11, and sequentially stored in the feature data memory 21.

When the client attempts to retrieve a content including an object of desired brightness and color, the client inputs data indicating the desired brightness and color to the client terminal 3. The client terminal 3 transmits the data indicating the brightness and color to the data conversion portion 23 of the content retrieval section 2. The data indicating the brightness and color may be hand-written data or data in the name format as that of the feature data stored in the feature data memory 21. If the data transmitted from the client terminal 3 is hand-written data, the data conversion portion 23 discerns the brightness and color indicated by the data, converts the discerned brightness and color into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data most approximate to the feature data indicating brightness and color transmitted from the client terminal 3 to determine a content including the object. The feature extraction/retrieval engine 22 instructs the file server 12 of the content storage section 1 to retrieve the determined content. The file server 12 reads the content from the disk 11, and supplies the content to the client terminal 3 via the content retrieval section 2.

The method for obtaining the most approximate feature data is as follows. Respective bits of the feature data transmitted from the client terminal 3 are compared with corresponding bits of feature data stored in the feature data memory 21, to obtain absolutes of the differences between the corresponding two bit values for all bits and then calculate the sum of the absolutes. This calculation is performed for all the feature data stored in the feature data memory 21, and feature data which provides the smallest sum is designated as the most approximate feature data.

Figure 8:
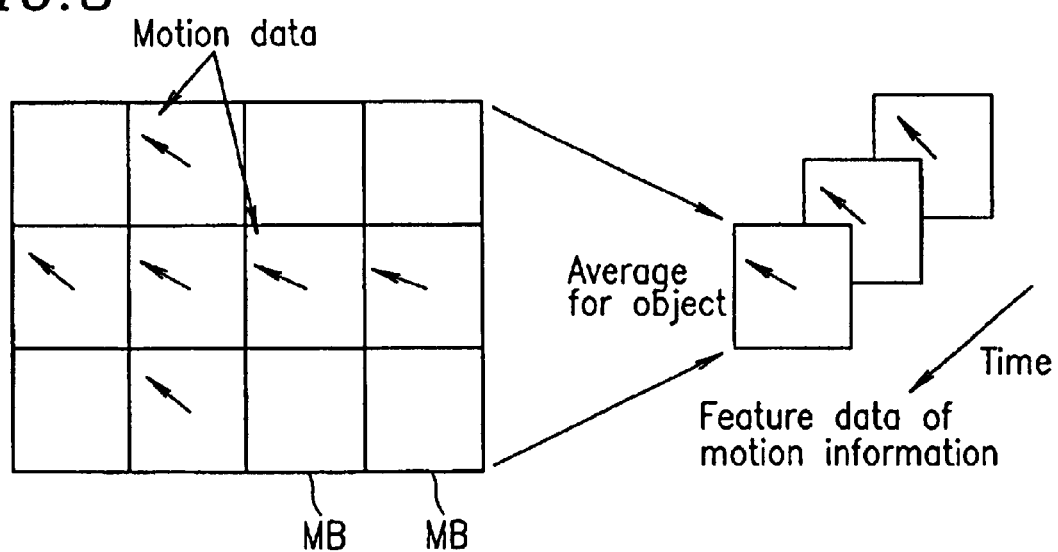
FIG. 8 is a view illustrating a processing of extracting motion information of an object as feature data.

In the case of extracting the motion of an object as feature data, the feature extraction/retrieval engine 22 of the content retrieval section 2 sequentially scans compressed contents stored in the disk 11 of the content storage section 1, to read the values of the motion of an object for respective macro blocks MB and then calculate averages of the values, as shown in FIG. 8, so as to store the temporally changing averages in the feature data memory 21 as feature data of motion information.

When the client attempts to retrieve a content containing an object of desired motion, the client inputs data indicating the desired motion to the client terminal 3. The client terminal 3 transmits the data indicating the motion to the data conversion portion 23 of the content retrieval section 2. The data indicating the motion may be hand-written data or data in the same format as that of the feature data stored in the feature data memory 21. If the data transmitted from the client terminal 3 is hand-written data, the data conversion portion 23 discerns the motion indicated by the data, converts the discerned motion into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data most approximate to the feature data indicating motion transmitted from the client terminal 3 and determines a content containing the object. The feature extraction/retrieval engine 22 instructs the file server 12 of the content storage section 1 to retrieve the content. The file server 12 reads the content from the disk 11, and supplies the content to the client terminal 3 via the content retrieval section 2.

The method for obtaining the most approximate feature data is as follows. Respective bits of the feature data transmitted from the client terminal 3 are compared with corresponding bits of feature data stored in the feature data memory 21, to obtain absolutes of the differences between the corresponding two bit values for all bits and then calculate the sum of the absolutes. This calculation of the sum of absolutes is performed for all the feature data stored in the feature data memory 21, and feature data which provides the smallest sum is designated as the most approximate feature data.

Figure 9:
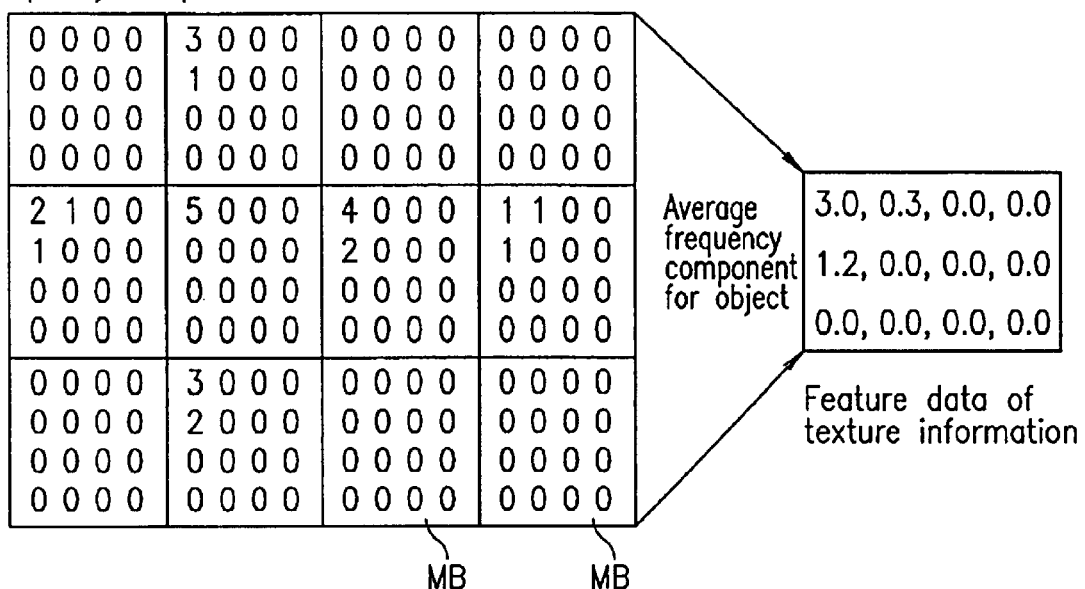
FIG. 9 is a view illustrating a processing of extracting texture information of an object as feature data.

In the case of extracting texture information of an object as feature data, the feature extraction/retrieval engine 22 of the content retrieval section 2 scans compressed contents stored in the disk 11 of the content storage section 1 sequentially to read DC components and AC components of luminance components, as well as DC components and AC components of chrominance components, for respective macro blocks, as shown in FIG. 9, to obtain an average of the DC components and an average of the AC components of luminance components, as well as an average of the DC components and an average of the AC components of chrominance components, for the entire object. The resultant averages are stored in the feature data memory 21 as feature data of the texture information. In this way, texture information is extracted for all multimedia contents stored in the disk 11, and sequentially stored in the feature data memory 21.

When the client attempts to retrieve a content containing an object having a desired texture, the client inputs data indicating the desired texture to the client terminal 3. The client terminal 3 transfers the data indicating the texture to the data conversion portion 23 of the content retrieval section 2. The data indicating the texture may be hand-written data or data in the same format as that of the feature data stored in the feature data memory 21. If the data transmitted from the client terminal 3 is hand-written data, the data conversion portion 23 discerns the texture indicated by the data, converts the discerned texture into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data most approximate to the feature data indicating the texture transmitted from the client terminal 3 and determine a content containing the object. The feature extraction/retrieval engine 22 instructs the file server 12 of the content storage section 1 to retrieve the content. The file server 12 reads the content from the disk 11, and supplies the content to the client terminal 3 via the content retrieval section 2.

The method for obtaining the most approximate feature data is as follows Respective bits of the feature data transmitted from the client terminal 3 are compared with corresponding bits of feature data stored in the feature data memory 21, to obtain absolutes of the differences between the corresponding two bit values for all bits and then calculate the sum of the absolutes This calculation is performed for all the feature data stored in the feature data memory 21, and feature data which provides the smallest sum is designated as the most approximate feature data.

FIG. 10 is a view of data structure of a compressed audio content in this example. An audio data structure includes a header which contains information such as the length and compression method of a sound, the bit rate at which the data is read and the velocity at which the data is reproduced after decompression, and the amount of data (frame) to be read at one time. In code excited linear prediction (CELP) audio coding of MPEG4, a prediction coefficient obtained when sound is predicted by linear prediction coding (LPC) is coded as tone information. A prediction error is separately coded as sound source information (amplitude information), and arranged with the tone information in pairs at predetermined time intervals (for each frame).

A method for extracting feature data from data of a compressed audio content with the above construction will be described.

In the case of extracting tone information of an object as feature data, the content retrieval section 2 scans compressed contents stored in the disk 11 of the content storage section 1 sequentially to read LPC coefficients of each of the contents for each frame, to obtain an average of the LPC coefficients for each frame and store the average in the feature data memory 21 as feature data of the tone information. In this way, tone information is extracted for all multimedia contents stored in the disk 11, and sequentially stored in the feature data memory 21.

When the client attempts to retrieve a content containing an object having desired tone, the client inputs data indicating the desired tone to the client terminal 3. The client terminal 3 transmits the data indicating the tone to the data conversion portion 23 of the content retrieval section 2. The data indicating the tone may be data indicating a hummed tone or data in the same format as that of the feature data stored in the feature data memory 21. If the data transmitted from the client terminal 3 is data indicating the tone, the data conversion portion 23 converts the data indicating the tone into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data most approximate to the feature data indicating the tone transmitted from the client terminal 3 and determine a content containing the object. The feature extraction/retrieval engine 22 instructs the file server 12 of the content storage section 1 to retrieve the determined content. The file server 12 reads the content from the disk 11, and supplies the content to the client terminal 3 via the content retrieval section 2.

The method for obtaining the most approximate feature data is as follows. Averages of LPC coefficients of respective frames as feature data transmitted from the client terminal 3 are compared with averages of LPC coefficients of respective frames as feature data stored in the feature data memory 21, to obtain absolutes of the differences between the corresponding two averages and then calculate the sum of the absolutes. This calculation is performed for all the feature data stored in the feature data memory 21, and feature data which provides the smallest sum (difference) is designated as the most approximate feature data.

In the case of extracting rhythm information of an object as feature data, the content retrieval section 2 scans compressed contents stored in the disk 11 of the content storage section 1 sequentially to read a prediction residual value (change in amplitude) of each of the contents for each frame and store the value in the feature data memory 21 as feature data of the rhythm information. In this way, rhythm information is extracted for all multimedia contents stored in the disk 11, and sequentially stored in the feature data memory 21.

When the client attempts to retrieve a content containing an object having desired rhythm, the client inputs rhythm information to the client terminal 3. The client terminal 3 transmits the rhythm information to the data conversion portion 23 of the content retrieval section 2. The rhythm information may be data indicating a hummed rhythm or data in the same format as that of the feature data stored in the feature data memory 21. If the data transmitted from the client terminal 3 is data indicating a rhythm, the data conversion portion 23 converts the data indicating the rhythm into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data most approximate to the feature data indicating the rhythm transmitted from the client terminal 3 and determines a content containing the object. The feature extraction/retrieval engine 22 instructs the file server 12 of the content storage section 1 to retrieve the content. The file server 12 reads the content from the disk 11, and supplies the content to the client terminal 3 via the content retrieval section 2.

The method for obtaining the most approximate feature data is as follows. Prediction residual values (changes in amplitude) for respective frames as feature data transmitted from the client terminal 3 are compared with prediction residual values (changes in amplitude) for respective frames as feature data stored in the feature data memory 21, to obtain absolutes of the differences between the corresponding two values and then calculate the sum of the absolutes. This calculation is performed for all the feature data stored in the feature data memory 21, and feature data which provides the smallest sum (difference) is designated as the most approximate feature data.

In the case of extracting melody information of an object as feature data, the content retrieval section 2 scans compressed contents stored in the disk 11 of the content storage section 1 sequentially to read LPC coefficients of the contents for each frame, thereby to obtain temporal changes of the LPC coefficients for respective frames and store the temporal changes in the feature data memory 21 as feature data of the melody information. In this way, melody information is extracted for all multimedia contents stored in the disk 11, and sequentially stored in the feature data memory 21.

When the client attempts to retrieve a content containing an object having a desired melody, the client inputs data indicating the melody to the client terminal 3. The client terminal 3 transmits the data indicating the melody to the data conversion portion 23 of the content retrieval section 2. The data indicating a melody may be data indicating a hummed melody or data in the same format as that of the feature data stored in the feature data memory 21. If the data transmitted from the client terminal 3 in data indicating a melody, the data conversion portion 23 converts the data indicating a melody into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data most approximate to the feature data indicating the melody transmitted from the client terminal 3 and determine a content containing the object. The feature extraction/retrieval engine 22 instructs the file server 12 of the content storage section 1 to retrieve the determined content. The file server 12 reads the content from the disk 11, and supplies the content to the client terminal 3 via the content retrieval section 2.

The method for obtaining the most approximate feature data is as follows. The temporal changes of the LPC coefficients for respective frames as feature data transmitted from the client terminal 3 are compared with the temporal changes of the LPC coefficients for respective frames as feature data stored in the feature data memory 21, to obtain absolutes of the differences between the corresponding two values and then calculate the sum of the absolutes. This calculation is performed for all the feature data stored in the feature data memory 21, and feature data which provides the smallest sum (difference) is designated as the most approximate feature data.

FIG. 11 illustrates a data structure of a compressed audio content in this example. An audio data structure includes a header which contains information such as the sampling frequency and compression method of an audio signal, the bit rate at which the data is read and the velocity at which the data is reproduced after decompression, and the amount of data (frame) to be read at one time. In time/frequency conversion coding of MPEG4, a frequency spectrum of an audio signal is analyzed by frequency analysis and the like to extract the spectral envelope value. The extracted value is coded as a spectrum normalization coefficient. The extracted value is also used to normalize a frequency component. More specifically, a frequency component is obtained by performing Modified discrete cosine transform (MDCT) for the audio signal, and divided by this extracted value to normalize the amplitude of the frequency component. The temporal redundancy of the normalized frequency component is reduced by prediction coding, and the redundancy thereof between channels is reduced by prediction coding between channels. The thus-processed frequency component is quantized and variable-length coded, and the resultant value is arranged sequentially, together with the spectrum normalization coefficient, for each time period (frame).

A method for extracting feature data from a compressed audio content with the above construction will be described.

In the case of extracting tone information of an object as feature data, the content retrieval section 2 scans compressed contents stored in the disk 11 of the content storage section 1 sequentially to read spectrum normalization coefficients of each of the contents for each frame, thereby to obtain averages of the spectrum normalization coefficients for each predetermined time period and store the averages in the feature data memory 21 as feature data of the tone information. In this way, tone information is extracted for all multimedia contents stored in the disk 11, and sequentially stored in the feature data memory 21.

When the client attempts to retrieve a content containing an object having desired tone, the client inputs data indicating the desired tone to the client terminal 3. The client terminal 3 transmits the data indicating the tone to the data conversion portion 23 of the content retrieval section 2. The data indicating the tone may be data indicating a hummed tone or data in the same format as that of the feature data stored in the feature data memory 21. If the data transmitted from the client terminal 3 is data indicating a tone, the data conversion portion 23 converts the data indicating a tone into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data most approximate to the feature data indicating the tone transmitted from the client terminal 3 and determine a content containing the object. The feature extraction/retrieval engine 22 instructs the file server 12 of the content storage section 1 to retrieve the determined content. The file server 12 reads the content from the disk 11, and supplies the content to the client terminal 3 via the content retrieval section 2.

The method for obtaining the most approximate feature data is as follows. Averages of spectrum normalization coefficients for each predetermined time period as feature data transmitted from the client terminal 3 are compared with averages of spectrum normalization coefficients for each predetermined time period as feature data stored in the feature data memory 21, to obtain absolutes of the differences between the corresponding two averages and then calculate the sum of the absolutes. This calculation is performed for all the feature data stored in the feature data memory 21, and feature data which provides the smallest sum (difference) is designated as the most approximate feature data.

In the case of extracting rhythm information of an object as feature data, the content retrieval section 2 scans compressed contents stored in the disk 11 of the content storage section 1 sequentially to read a frequency component value after spectrum normalization (change in amplitude) of each of the contents for each frame and store the frequency component value in the feature data memory 21 as feature data of the rhythm information. In this way, rhythm information is extracted for all multimedia contents stored in the disk 11, and sequentially stored in the feature data memory 21.

When the client attempts to retrieve a content containing an object having desired rhythm, the client inputs rhythm information to the client terminal 3. The client terminal 3 transmits the rhythm information to the data conversion portion 23 of the content retrieval section 2. The rhythm information may be data indicating a hummed rhythm or data in the same format as that of the feature data stored in the feature data memory 21. If the data transmitted from the client terminal 3 is data indicating a rhythm, the data conversion portion 23 converts the data indicating a rhythm into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data most approximate to the feature data indicating the rhythm transmitted from the client terminal 3 and determines a content containing the object. The feature extraction/retrieval engine 22 instructs the file server 12 of the content storage section 1 to retrieve the content. The file server 12 reads the content from the disk 11, and supplies the content to the client terminal 3 via the content retrieval section 2.

The method for obtaining the most approximate feature data is as follows. Frequency component values after spectrum normalization (changes in amplitude) for respective frames as feature data transmitted from the client terminal 3 are compared with frequency component values after spectrum normalization (changes in amplitude) for respective frames as feature data stored in the feature data memory 21, to obtain absolutes of the differences between the corresponding two values and then calculate the sum of the absolutes. This calculation is performed for all the feature data stored in the feature data memory 21, and feature data which provides the smallest sum (difference) is designated a& the most approximate feature data.

In the case of extracting melody information of an object as feature data, the content retrieval section 2 scans compressed contents stored in the disk 11 of the content storage section 1 sequentially to read spectrum normalization coefficients of the contents for each frame, thereby to obtain temporal changes of the spectrum normalization coefficients for respective frames and store the temporal changes in the feature data memory 21 an feature data of the melody information. In this way, melody information is extracted for all multimedia contents stored in the disk 11, and sequentially stored in the feature data memory 21.

When the client attempts to retrieve a content containing an object having a desired melody, the client inputs data indicating the melody to the client terminal 3. The client terminal 3 transmits the data indicating the melody to the data conversion portion 23 of the content retrieval section 2. The data indicating a melody may be data indicating a hummed melody or data in the same format as that of the feature data stored in the feature data memory 21. If the data transmitted from the client terminal 3 is data indicating a melody, the data conversion portion 23 converts the data indicating a melody into feature data, and transfers the converted feature data to the feature extraction/retrieval engine 22. If the data transmitted from the client terminal 3 is in the same format as that of the feature data stored in the feature data memory 21, the data conversion portion 23 transfers the feature data to the feature extraction/retrieval engine 22. The feature extraction/retrieval engine 22 searches the feature data memory 21 to select an object having feature data most approximate to the feature data indicating the melody transmitted from the client terminal 3 and determine a content containing the object. The feature extraction/retrieval engine 22 instructs the file server 12 of the content storage section 1 to retrieve the determined content. The file server 12 reads the content from the disk 11, and supplies the content to the client terminal 3 via the content retrieval section 2.

The method for obtaining the most approximate feature data is as follows. The temporal changes of the spectrum normalization coefficients for respective frames as feature data transmitted from the client terminal 3 are compared with the temporal changes of the spectrum normalization coefficients for respective frames as feature data stored in the feature data memory 21, to obtain absolutes of the differences between the corresponding two spectrum normalization coefficients and then calculate the sum of the absolutes for each feature data. This calculation is performed for all the feature data stored in the feature data memory 21, and feature data which provides the smallest sum (difference) is designated as the most approximate feature data.

FIG. 12 illustrates a data structure of a compressed multimedia content in this example. In the MPEG4 coding method, multimedia content is composed of objects, and the respective objects are recorded after compression. Each of the compressed object data has an object description affixed thereto where the summary of the object is described as a text.

A method for extracting feature data from the compressed content with the above construction will be described.

Herein, the case of extracting word information found in the object description as feature data will be described. The content retrieval section 2 sequentially scans compressed contents stored in the disk 11 of the content storage section 1, reading the object description of each object. More specifically, the frequency of appearance of a word used in the object description, as well as the frequency of appearance of a combination of a word with a preceding or following word, are determined, and these frequencies of appearance are stored in the feature data memory 21 as feature data of the word information. In this way, feature data of the word information is extracted from the object descriptions for all multimedia contents stored in the disk 11, and stored sequentially in the feature data memory 21.

When the client attempts to retrieve a multimedia content having an object description including a desired word or combination of words, the client inputs the word or combination of words to the client terminal 3. The client terminal 3 transmits the word or combination of words to the data conversion portion 23 of the content retrieval section 2. The content retrieval section 2 sequentially compares the word or combination of words with the feature data of word information stored in the feature data memory 21, to select feature data of word information having the highest frequency of appearance for the word or combination of words desired by the client and determine an object having the selected feature data and thus a content including the object. The content retrieval section 2 instructs the file server 12 of the content storage section 1 to transmit the determined content. The file server 12 reads the content from the disk 11, and supplies the content to the client terminal 3 via the content retrieval section 2.

The above-described processing can be implemented in the form of a computer program.

Thus, in this example, feature data is created in advance as retrieval data by directly extracting from each of the compressed contents. This allows for easy retrieval and extraction of a content having a desired feature.

For example, retrieval of a content based on the shape is possible, realizing visual retrieval and extraction of a desired content. Also, retrieval of a content based on the color and brightness is possible, realizing retrieval and extraction of a multimedia content of which expression by words is difficult. Further, retrieval of a content by the motion is possible, realizing retrieval and extraction of a motion picture content, in addition to still picture information. Retrieval of a content by the texture is also possible, realizing retrieval and extraction of a multimedia content having a complicated pattern. For example, retrieval of a content by the tone is possible, realizing retrieval and extraction of a music or voice content based on sound. Retrieval of a content by the rhythm is possible, realizing sensuous retrieval and extraction of a music or voice content. Further, retrieval of a content by the melody is possible, realizing direct retrieval and extraction of a music or voice content. Furthermore, retrieval of a content by a word used in the description of the content is possible, realizing retrieval and extraction of a multimedia content based on a description term.

EXAMPLE 2

Figure 13:
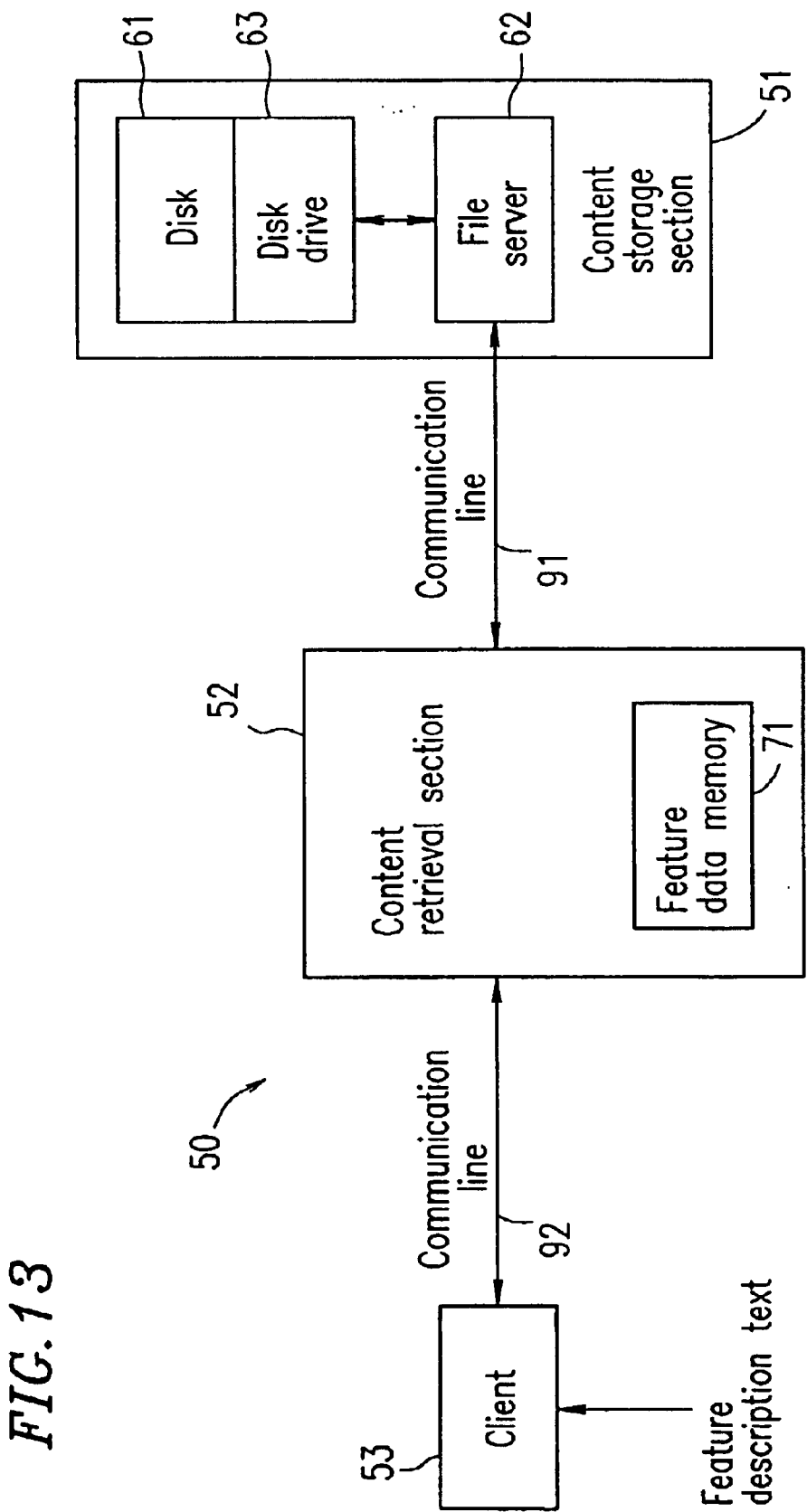
FIG. 13 is a view illustrating a construction of a multimedia content retrieval device of Example 2 according to the present invention.

FIG. 13 is a view illustrating the configuration of a multimedia content retrieval device of Example 2 according to the present invention. Referring to FIG. 13, a multimedia content retrieval device 50 includes a content storage section 51, a content retrieval section 52, a client terminal 53, and communication lines 91 and 92. The content storage section 51 stores a plurality of compressed contents representing images, sounds, and the like. The content retrieval section 52 accesses the content storage section 51 for retrieving a content. The client terminal 53 requests the content retrieval section 52 to retrieve a content. Normally, a plurality of content storage sections 51 and a plurality of client terminals 53 are connected via communication lines so that each of the client terminals 53 can access any of the content storage sections 51 via the content retrieval section 52.

The content storage section 51 includes a file server 62 and a disk drive 63. The disk drive 63 records and reproduces a plurality of compressed contents on and from a disk 61. The file server 62 controls the disk drive 63 to control the recording and reproduction of contents on and from the disk 61, and performs data communication with external terminals via the communication line 91.

The content retrieval section 52 is connected to the content storage section 51 via the communication line 91. The content retrieval section 52 extracts a feature of an object included in a content for all contents stored in the disk 61, and stores extracted low-level feature data, such as the shape, color, brightness, and motion, in a feature data memory 71.

The client terminal 53 includes a computer, a keyboard, a memory, a display, and the like. Upon receipt of a feature description text describing a feature of a desired content by the client's operation of the keyboard and the like, the client terminal 53 transmits the feature description text to the content retrieval section 52 via the communication line 92.

The content retrieval section 52 extracts a keyword from the received feature description text and converts the keyword into low-level feature data. The resultant low-level feature data is compared with feature data stored in the feature data memory 71 sequentially, to select feature data most approximate to the converted feature data among the feature data stored in the feature data memory 71, and determine an object having the selected feature data and thus a content including the object. The content retrieval section 52 retrieves the determined content from the content storage section 51 and sends the retrieved content or an address at which the content is recorded on the disk 61 to the client terminal 53, so as to achieve the retrieval of the content desired by the client.

Figure 15:
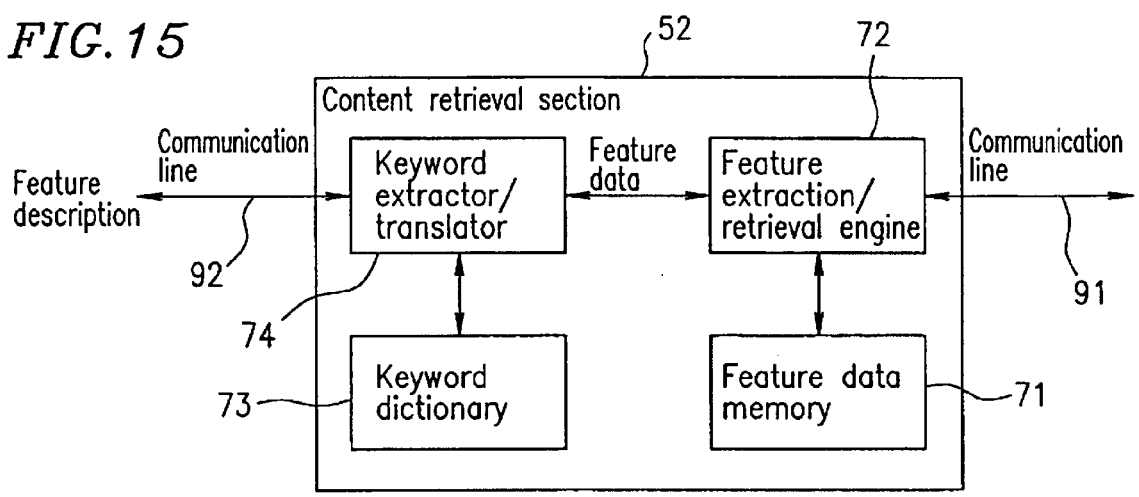
FIG. 15 is a view illustrating a construction of a content retrieval section in Example 2 in more detail.
Figures 17, 18:
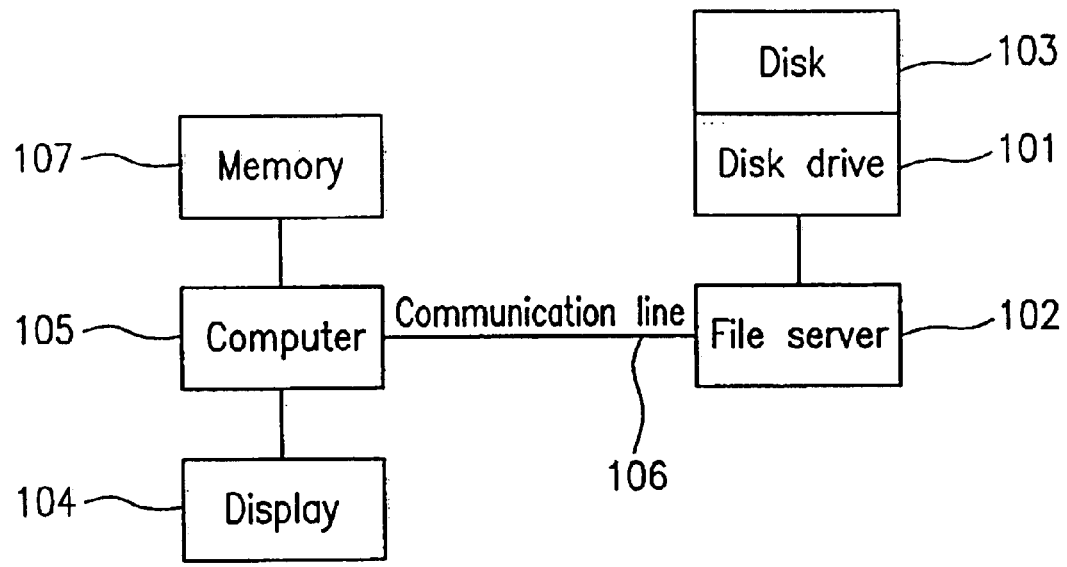
FIG. 17 is a view illustrating a construction of a conventional multimedia content retrieval system.
FIG. 18 is a data table in the conventional system.

FIG. 15 illustrates the construction of the content retrieval section 52 in more detail. The content retrieval section 52 includes: a feature extraction/retrieval engine 72 connected to the communication line 91; the feature data memory 71 connected to the feature extraction/retrieval engine 72; a keyword extractor/translator 74 connected to the communication line 92 and the feature extraction/retrieval engine 72; and a keyword dictionary 73 connected to the keyword extractor/translator 74.

When a feature description text is supplied to the content retrieval section 52 from the client terminal 53, the keyword extractor/translator 74 extracts a keyword from the feature description text. As a keyword, a word or a combination of words which is a noun, verb, adjective, adverb, or the like is extracted from the text. For example, when an expression "a scene where a person is running in the evening sun" is input as a feature description text, words and combinations of words found in the text, such as "person", "running", and "evening sun" are extracted from the feature description text. The extracted words or combination of words are compared with keywords registered in the keyword dictionary 73 as shown in FIG. 16 to search for a keyword matching with each of the above words and combination of words. Assuming that keywords "person", "run", "evening sun", and the like are registered in the keyword dictionary 73 as shown in FIG. 16, the keywords matching with the respective words and combination of words are retrieved.

The keyword extractor/translator 74 converts each of the retrieved keywords into feature data using the keyword dictionary 73. For example, the keyword "evening sun" is converted into five feature data of [shape: round, color: red, brightness: 192, motion: (0, −1), texture: even]. The keyword "person" is converted into four feature data of [shape: human-like, color: skin color, brightness: 128, texture: skin-like]. The keyword "run" is converted into one feature data of [motion: (±10, 0)]. These feature data are sent to the feature extraction/retrieval engine 72.

The feature extraction/retrieval engine 72 compares the feature data of each keyword supplied from the keyword extractor/translator 74 with feature data of respective objects stored in the feature data memory 71 as shown in FIG. 14, selects an object having feature data most approximate to the supplied feature data, determines a content including the object, and instructs the file server 62 of the content storage section 51 to retrieve the content. The file server 62 reads the content from the disk 61, and supplies the content to the client terminal 53 via the content retrieval section 52. Alternatively, the feature extraction/retrieval engine 72 may supply an address of the content on the disk 61 of the content storage section 51 to the client terminal 53.

The feature data for the contents stored in the feature data memory 71 may be created manually during production of the contents, or may be automatically extracted from the contents and stored.

In Example 2, as in Example 1, since the data amount of multimedia contents representing images, sounds, and the like is enormously large, the contents are normally compressed by a compression coding method such as MPEG before being recorded on the disk 61 of the content storage section 51.

Therefore, as in the feature extraction/retrieval engine 22 in Example 1, it is possible for the feature extraction/retrieval engine 72 to scan compressed contents stored in the disk 61 of the content storage section 51 sequentially, to extract the shape, color and brightness, motion, texture, and the like of each object as feature data of the object and store the feature data in the feature data memory 71. In this way, feature data can be extracted from all the multimedia contents stored in the disk 61 and stored sequentially in the feature data memory 71, so that data storage as shown in FIG. 14 is established in the feature data memory 71. In FIGS. 14 and 16, shape 1 of the object item represents a shape of feature data extracted from a macro block as shown in FIG. 4, and shape 2 represents a shape of feature data extracted from a wire-frame model as shown in FIG. 5.

In the keyword dictionary 73 as shown in FIG. 16, keywords and feature data are registered in advance for all words and combinations of words anticipated to appear in feature description texts for retrieval of multimedia contents. For example, for the combination of words "evening sun" anticipated to appear in feature description texts, the keyword "evening sun", feature data representing the shape, feature data representing the color and brightness, feature data representing the motion, and feature data representing the texture are registered in the keyword dictionary 73. All of these feature data are registered in the same format an that of the feature data stored in the feature data memory 71.

The feature extraction/retrieval engine 72, as in the feature extraction/retrieval engine 22 in Example 1, compares feature data of a keyword supplied from the keyword extractor/translator 74 with feature data of objects stored in the feature data memory 71, and selects feature data most approximate to the supplied feature data. In Example 2, as in Example 1, feature data most approximate to the feature data of the supplied keyword is selected among all the feature data stored in the feature data memory 71 in respective manners determined in accordance with the shape, color and brightness, motion, texture, and the like of each object.

In the case where a plurality of keywords are extracted from a feature description text input via the client terminal 53, respective feature data most approximate to the feature data of the keywords are retrieved for each content, and differences of these feature data are summed to obtain an overall difference between the content and the feature description text. By examining the overall differences of all contents, a content most approximate to the feature description desired by the client can be retrieved.

In the MPEG4 coding, as described above, a multimedia content is composed of objects, and the respective objects are recorded after compression. Each of the compressed object data includes an object description where the summary of the object to described as a text.

In the above MPEG4 coding, the following procedure is possible. That is, the content retrieval section 52 sequentially scans compressed contents stored in the disk 61 of the content storage section 51, reading the object description of each object. More specifically, the frequency of appearance of a word used in the object description, as well as the frequency of appearance of a word with a preceding or following word, are stored in the feature data memory 71 as feature data of word information. In this way, feature data of word information is extracted from the object descriptions for all multimedia contents stored in the disk 61, and stored sequentially in the feature data memory 71.

When the client attempts to retrieve a desired content based on a word or combination of words, the content retrieval section 52 extracts a keyword (word or combination of words) from an input feature description text, and compares the extracted keyword with the word information stored in the feature data memory 71 sequentially without consulting the keyword dictionary 73, to select feature data of the word information having the highest frequency of appearance for the extracted keyword and determine an object having the selected feature data and thus a content including the object. The content retrieval section 52 then instructs the file server 62 of the content storage section 51 to retrieve the determined content. The file server 62 reads the content from the disk 61, and supplies the content to the client terminal 53 via the content retrieval section 52.

When a plurality of keywords are extracted from a feature description text supplied from the client terminal 53, the sum of the frequencies of appearance of the respective keywords are calculated for each content, to select a content having the largest sum of frequencies. This enables retrieval of a content most approximate to the desired content supplied from the client terminal 53.

The above-described processing can be implemented in the form of a computer program.

Thus, in this example, a content having a feature desired by the client can be easily retrieved and extracted by using low-level feature data directly extracted from a compressed content even if a high-level feature description text is input by the client as retrieval data for the content.

For example, a keyword extracted from a feature description text can be easily converted into feature data complying with the format of feature data stored in the feature data memory, realizing more correct retrieval and extraction of a desired multimedia content.

A keyword extracted from a feature description text can be easily converted into feature data complying with the format of feature data stored in the feature data memory, realizing retrieval and extraction of a desired multimedia content with a higher probability of success.

In the case of extracting shape information from a feature description text, retrieval and extraction of a desired multimedia content is realized with a higher probability of success.

In the case of extracting color and brightness information from a feature description text, retrieval of a content based on the color and brightness is possible, realizing more correct retrieval and extraction of a desired multimedia content.

In the case of extracting motion information from a feature description text, retrieval of a content based on the motion is possible, realizing more correct retrieval and extraction of a desired multimedia content.

In the case of extracting a keyword relating to a texture from a feature description text, retrieval of a content based on the texture information is possible, realizing more correct retrieval and extraction of a multimedia content having a complicated pattern.

Retrieval of a content based on a word used in the description of the content is possible, realizing retrieval and extraction of a multimedia content based on a description term.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multimedia data retrieval device comprising:
    a content storage section for storing a plurality of compressed contents;
    a client terminal for inputting feature data;
    a feature data storage section for reading feature data extracted from at least one of the compressed contents from the content storage section and storing the feature data of the at least one compressed contents; and
    a content retrieval section for selecting feature data approximate to the feature data input via the client terminal among the feature data stored in the feature data storage section, and retrieving a content having the selected feature data from the content storage section,
    wherein the feature data extracted from a compressed content is extracted from a part of a compressed component of the compressed content without fully decompressing the compressed content,
    wherein each of the compressed contents includes a plurality of macro blocks representing an image shape, motion vectors of an object represented by macro block motion information are read to obtain an average of the motion vectors of the object, and the average is used as feature data of motion information of the object represented by the content.

2. A multimedia data retrieval device according to claim 1, wherein each of the compressed contents includes a plurality of macro blocks representing an image shape, the image shape represented by the macro blocks is converted into a value consisting of at least one bit, and the bit is used as feature data of a shape represented by the content.

3. A multimedia retrieval device according to claim 1, wherein each of the compressed contents includes mesh-coded data representing an image shape, and the mesh-coded data is used as feature data of a shape represented by the content.

4. A multimedia data retrieval device according to claim 1, wherein each of the compressed contents includes a plurality of macro blocks representing an image shape, an average of DC components of a luminance component (Y) and a DC component of each of chrominance components (Pb, Pr) are obtained for each macro block, and the average and the DC components are used as feature data of color information and brightness information represented by the content.

5. A multimedia data retrieval device according to claim 1, wherein each of the compressed contents includes a plurality of macro blocks representing an image shape, DC components and AC components of a luminance component and DC components and AC components of a chrominance component of an object represented by the macro blocks are read, and averages of the respective components are obtained and used as feature data of texture information of the object represented by the content.

6. A multimedia data retrieval device according to claim 1, wherein each of the compressed contents includes frames representing sound, LPC coefficients recorded for each frame are read, and an average of the LPC coefficients is obtained and used as feature data of tone information represented by the multimedia content.

7. A multimedia data retrieval device according to claim 1, wherein each of the compressed contents includes frames representing sound, spectrum normalization coefficients recorded for each frame are read, and an average of the spectrum normalization coefficients is obtained for each predetermined time period and used as feature data of tone information.

8. A multimedia data retrieval device according to claim 1, wherein each of the compressed contents includes frames representing sound, a prediction residual recorded for each frame is read, and the prediction residual is used as feature data of rhythm information.

9. A multimedia data retrieval device according to claim 1, wherein each of the compressed contents includes frames representing sound, a frequency component after spectrum normalization performed for each Same is read, and the frequency component is used as feature data or rhythm information.

10. A multimedia data retrieval device according to claim 1, wherein each of the compressed contents includes frames representing sound, LPC coefficients recorded for each frame are read, and a temporal change of the LPC coefficients is used as feature data of melody information.

11. A multimedia data retrieval device according to claim 1, wherein each of the compressed contents includes frames representing sound, spectrum normalization coefficients recorded for each frame are read, and a temporal change of the spectrum normalization coefficients is used as feature data of melody information.

12. A multimedia data retrieval device according to claim 1, wherein each of the compressed contents includes a plurality of objects, an object description recorded for each object is read, and a frequency of appearance of a word, as well as a frequency of appearance of a combination of a word and a preceding or following word, used in the object description are used as feature data of word information.

13. A device according to claim 1, wherein the feature data further comprises data representing an image shape.

14. A multimedia data retrieval method comprising the steps of:

storing a plurality of compressed contents;

inputting feature data via a client terminal;

reading feature data extracted from the compressed contents and storing the feature data of the compressed contents; and selecting feature data approximate to the feature data input via the client terminal among the stored feature data, and retrieving a content having the selected feature data from the stored contents, wherein the data input by the client terminal is either manually generated data or data in the same format of the stored feature data wherein the feature data extracted from a compressed content is extracted from a part of a compressed component of the compressed content without fully decompressing the compressed content, wherein each of the compressed contents includes a plurality of macro blocks representing an image shape, motion vectors of an object represented by macro block motion information are read to obtain an average of the motion vectors of the object, and the average is used as feature data of motion information of the object represented by the content.

15. A method according to claim 14, wherein the feature data further comprises data representing an image shape.

* * * * *

UNITED STATES PATENT AND TRADEMARK OFFICE
CERTIFICATE OF CORRECTION

PATENT NO. : 6,785,429 B1
DATED : August 31, 2004
INVENTOR(S) : Takanori Senoh

It is certified that error appears in the above-identified patent and that said Letters Patent is hereby corrected as shown below:

Title page,
Item [57], ABSTRACT,
Line 4, "data," should read -- data; --.

Column 20,
Line 54, "Same" should read -- frame --.

Signed and Sealed this

First Day of February, 2005

JON W. DUDAS
*Director of the United States Patent and Trademark Office*